United States Patent
Engeldinger et al.

(10) Patent No.: US 10,633,559 B2
(45) Date of Patent: Apr. 28, 2020

(54) HEAT-ACTIVATED, GLUEABLE SURFACE ELEMENTS

(71) Applicant: tesa SE, Norderstedt (DE)

(72) Inventors: Hans Karl Engeldinger, Quickborn (DE); Judith Grünauer, Hamburg (DE); Klaus Keite-Telgenbüscher, Hamburg (DE)

(73) Assignee: TESA SE, Norderstedt (DE)

( * ) Notice: Subject to any disclaimer, the term of this patent is extended or adjusted under 35 U.S.C. 154(b) by 66 days.

(21) Appl. No.: 15/417,820

(22) Filed: Jan. 27, 2017

(65) Prior Publication Data

US 2017/0145260 A1    May 25, 2017

Related U.S. Application Data

(62) Division of application No. 13/518,182, filed as application No. PCT/EP2010/069057 on Dec. 7, 2010, now abandoned.

(30) Foreign Application Priority Data

Dec. 21, 2009 (DE) .................. 10 2009 055 099

(51) Int. Cl.
   *C09J 5/06*      (2006.01)
   *C09J 11/04*    (2006.01)

(52) U.S. Cl.
   CPC ............... *C09J 5/06* (2013.01); *C09J 11/04* (2013.01); *Y10T 156/10* (2015.01)

(58) Field of Classification Search
   CPC ............ C09J 5/05; C09J 11/04; Y10T 156/10
   See application file for complete search history.

(56) References Cited

U.S. PATENT DOCUMENTS

| 4,029,837 A * | 6/1977 | Leatherman ........ B29C 65/3476 |
| | | 442/16 |
| 5,026,748 A | 6/1991 | Adams et al. |
| | | (Continued) |

FOREIGN PATENT DOCUMENTS

| DE | 10210661 A1 | 5/2003 |
| DE | 202007003450 U1 | 6/2007 |
| | (Continued) | |

OTHER PUBLICATIONS

International Search Report for Application PCT/EP2010/069057 dated May 30, 2011.
(Continued)

*Primary Examiner* — Daniel McNally
(74) *Attorney, Agent, or Firm* — Norris McLaughlin, P.A.

(57) ABSTRACT

A method comprising bonding an element to one or more bonding substrates by inductive heating using a magnetic field whose frequency is situated in a frequency range from 100 Hz to 200 kHz. The element comprises at least one electrically conducting layer having an electrical conductivity of more than 40 MS/m for 300K and at least one heat-activatable adhesive layer coated onto at least one side of the electrically conducting layer, and the heat-activatable adhesive layer comprises at least one thermally conductive filler. The material of the thermally conductive filler has a thermal conductivity of at least 0.5 W/(m*K) and is electrically nonconducting such that the element provides, in a direction perpendicular to the areal extent of the element, an electrical breakdown resistance, as determined in accordance with VDE 0100.

16 Claims, 1 Drawing Sheet

(56) References Cited

U.S. PATENT DOCUMENTS

| | | | |
|---|---|---|---|
| 5,240,542 A * | 8/1993 | Miller | B23K 13/015 156/272.4 |
| 5,290,624 A | 3/1994 | Bujard | |
| 5,770,296 A * | 6/1998 | Remerowski | C09J 5/06 428/80 |
| 6,031,025 A * | 2/2000 | Mercer | C08K 3/22 523/220 |
| 6,096,414 A | 8/2000 | Young | |
| 6,123,799 A | 9/2000 | Ohura et al. | |
| 6,207,272 B1 | 3/2001 | Takahira et al. | |
| 6,214,460 B1 * | 4/2001 | Bluem | C09J 4/00 428/355 AC |
| 6,346,334 B1 | 2/2002 | Kamitani | |
| 7,229,683 B2 | 6/2007 | Fischer et al. | |
| 2003/0121909 A1 * | 7/2003 | Riess | B23K 13/01 219/633 |
| 2004/0241410 A1 * | 12/2004 | Fischer | C09J 9/00 428/292.1 |
| 2007/0029309 A1 * | 2/2007 | Keite-Telgenbuscher | B60R 1/0602 219/549 |
| 2008/0196831 A1 | 8/2008 | Friese et al. | |
| 2009/9311479 | 12/2009 | Husemann et al. | |
| 2010/0038025 A1 | 2/2010 | Keite-Telgen-Büscher et al. | |
| 2011/0193010 A1 | 8/2011 | Keite-Telgenbüscher et al. | |

FOREIGN PATENT DOCUMENTS

| | | |
|---|---|---|
| DE | 102006042816 A1 | 6/2008 |
| DE | 102007007617 A1 | 8/2008 |
| EP | 0456428 A2 | 11/1991 |
| EP | 1056312 A2 | 11/2000 |
| EP | 1475424 A1 | 11/2004 |
| EP | 1956063 A2 | 8/2008 |
| JP | H05179209 A | 7/1993 |
| JP | H05179210 A | 7/1993 |
| JP | H-06219860 A | 8/1994 |
| JP | 2000219852 A | 8/2000 |
| JP | 2009144144 A | 7/2009 |
| JP | 2012-504668 A | 2/2012 |
| WO | 2010037676 A1 | 4/2010 |

OTHER PUBLICATIONS

Japanese Office Action for corresponding Japanese Application No. 2012-545204 dated Jul. 24, 2014.

English Translation of Japanese Office Action corresponding to Japanese Application No. 2017137086 dated Jun. 12, 2018.

English Translation of Korean Office Action corresponding to Korean Application No. 102018-7000424 dated Apr. 9, 2018.

* cited by examiner

HEAT-ACTIVATED, GLUEABLE SURFACE ELEMENTS

This is a divisional application of U.S. Ser. No. 13/518,182, which was filed on 21 Jun. 2012, which is a 371 of PCT/EP2010/069057 filed 7 Dec. 2010 (international filing date), and claims the priority of German Application No. 10 2009 055 099.2, filed on 21 Dec. 2009.

The invention relates to heat-activatedly bondable sheetlike elements more particularly having high bonding forces for plastic/plastic bonds and also to a method for such bonds.

BACKGROUND

Heat-activatedly bondable sheetlike elements (heat-activatable sheetlike elements) are used in order to obtain high-strength connections between adherends. Especially suitable are sheetlike elements of this kind for achieving, in the case of a relatively thin bondline, strengths comparable with or higher than those possible with sheetlike elements which contain exclusively pressure-sensitive adhesive systems. Such high-strength bonds are important particularly in light of the ongoing miniaturization of electronic devices, in the consumer electronics, entertainment electronics or communications electronics segment, for instance, as for example for cell phones, PDAs, laptops and other computers, digital cameras, and display devices such as displays and digital readers, for instance.

The requirements in terms of processability and stability of adhesive bonds are increasing particularly in portable consumer electronics articles. One reason for this is that the dimensions of such articles are becoming ever smaller, and so the area that can be utilized for an adhesive bond is also reduced. Another reason is that an adhesive bond in such devices must be particularly stable, since portable articles are required to withstand severe mechanical loads such as impacts or drops, for instance, and, moreover, are to be used across a broad temperature range.

In products of these kinds, therefore, it is preferred to use heat-activatedly bondable sheetlike elements which have heat-activatedly bonding adhesives, i.e., adhesives which at room temperature have no inherent tack, or at best a slight inherent tack, but which, when exposed to heat, develop the bond strength needed for a bond to the respective bonding substrates (adherends, adhesion base). At room temperature, heat-activatedly bonding adhesives of these kinds are frequently in solid form, but in the course of bonding, as a result of temperature exposure, are converted either reversibly or irreversibly into a state of high bond strength. Reversibly heat-activatedly bonding adhesives are, for example, adhesives based on thermoplastic polymers, whereas irreversibly heat-activatedly bonding adhesives are, for instance, reactive adhesives, in which thermal activation triggers chemical reactions such as crosslinking reactions, for example, thereby making these adhesives particularly suitable for permanent high-strength bonds.

In this context there is a requirement more particularly for increasingly thin adhesive tapes, with no reduction in the strength requirements. Heat-activatable films are presently available in a very wide thickness range—thus thicknesses of 30 to 250 μm are not unusual.

A feature common to all heat-activatedly bonding adhesive systems is that for bonding they must be heated. Particularly in the case of bonds where the adhesive systems are hidden from the outside over their full area by the bonding substrates, it is particularly important for the heat necessary for melting or for activating the adhesive to be transported toward the bonding area quickly. If one of the bonding substrates here is a good thermal conductor, then it is possible to heat that bonding substrate by means of an external heat source, as for example through a direct heat transfer medium, an infrared heater or the like.

In the case of such direct heating or contact heating, however, the short heating time that is needed for rapid, homogeneous heating of the known adhesive can be realized only for a large temperature gradient between the heat source and the bonding substrate. Consequently, the bonding substrate that is to be heated ought itself to be insensitive with respect to temperatures which in some cases may even be considerably higher than actually necessary for the melting or activating of the adhesive. Accordingly, the use of heat-activatable adhesive films is problematic for plastic/plastic bonds. Plastics used in particular in consumer electronics include, for example, polyvinyl chloride (PVC), acrylonitrile-butadiene-styrene copolymers (ABS), polycarbonates (PC), polypropylene (PP) or blends based on these plastics.

The situation is different, then, if none of the bonding substrates is a sufficiently good thermal conductor or if the bonding substrates are sensitive toward higher temperatures, as is the case, for example, with many plastics, but also with electronic components such as semiconductor components or liquid-crystal modules, for instance. For the bonding of bonding substrates made from materials of low thermal conductivity or from heat-sensitive materials, therefore, it is appropriate to equip the heat-activatedly bondable sheetlike element itself with an intrinsic mechanism for heating, so that the heat required for bonding need not be introduced from the outside, but is instead generated directly in the interior of the sheetlike element itself. In the prior art there are various mechanisms known that allow such internal heating to be realized, in the form, for instance, of heating by means of an electrical resistance heater, through magnetic induction or by interaction with microwave radiation.

Heating in an alternating magnetic field is achieved on the one hand through induced eddy currents in electrically conductive receptors and on the other hand—to give a model-based explanation—through hysteresis losses by the surrounding elementary magnets in the alternating field. For eddy currents to develop, however, the conductive domains are required to have a certain minimum size. The lower the frequency of the alternating field, the greater this minimum size is. Depending on the receptor material, both effects occur in unison (e.g., magnetic metals) or only one effect occurs in each case (e.g., eddy currents only in the case of aluminum; hysteresis only in the case of iron oxide particles).

In principle, a variety of heating devices for inductive heating are known; one of the parameters which can be used to distinguish them is the frequencies possessed by the alternating magnetic field generated using the heating device in question. For instance, induction heating may be accomplished using a magnetic field whose frequency is situated in the frequency range from about 100 Hz to about 200 kHz (the so-called medium frequencies; MF) or else in the frequency range from about 300 kHz to about 100 MHz (the so-called high frequencies; HF). In addition, as a special case, there are also heating devices known whose magnetic field possess a frequency from the microwave range, such as the standard microwave frequency of 2.45 GHz, for example.

Rising in line with the frequency of the alternating field used is the technical cost and complexity involved in generating the alternating field, and hence the costs of the heating device. Whereas middle-frequency systems are already currently available at a market price of around 5000 euros, the outlay for high-frequency systems is at least 25 000 euros. Also rising in line with the frequency, furthermore, are the safety requirements concerning the heating system, and so, for high-frequency systems, it is regularly necessary to add, to the higher acquisition costs, higher costs for the installation of such technology as well.

Where high frequencies are used for the adhesive bonding of components in electronic devices, it is possible, furthermore, for unwanted damage to occur to electronic components in these devices in the course of their exposure to the alternating electromagnetic field.

Example applications that may be given for induction heating include manufacturing operations from the areas of bonding, seam sealing, curing, tempering, and the like. The usual technique here is to employ those methods where the inductors surround components completely or partially and heat them uniformly over the entire extent or, when required, deliberately nonuniformly, in accordance, for example, with EP 1 056 312 A2 or with DE 20 2007 003 450 U1.

DE 20 2007 003 450 U1 sets out for example, inter alia, a method for fusing a container opening with a sealing film, in which the metallic inlay of a sealing film is heated by induction and a sealing adhesive is melted by conduction of heat. The containers are closed with a screw-on or snap-in lid, which comprises a metal foil and an adjacent polymeric sealing film. Using the induction coil, eddy currents are generated in the metal foil, and heat the metal foil. As a result of the contact between metal foil and sealing film, the sealing film is also heated and is thereby fused with the container opening. Induction coils in tunnel form have the advantage over flat coils that they can be used as well to seal containers having a large distance between the metal foil and the top edge of the lid, since the coil acts on the metal foil from the side.

A disadvantage of this method is that a substantially greater part of the component volume than the pure adhesive volume and the metal foil is passed through the electromagnetic field and hence, in the case of an electronic component, instances of damage are not ruled out, since heating may occur at unwanted locations. A further disadvantage is that the entire lid film is heated, whereas only the edge region in contact with the container would be sufficient for bonding. Hence there is a large ratio of heated area to bonding area, which for typical beverage bottles having an opening diameter of 25 mm and a bonding width of 2 mm is approximately 6.5. For larger container diameters, the ratio goes up in the case of the usually constant bonding width.

In recent years, for the inductive heating particularly in the bonding of plastic on plastic, inductively heatable heat-activatable adhesive films (HAFs) have moved back beneath the spotlight. The reason for this is to be found in the nanoparticulate systems that are now available, such as MagSilica™ (Evonik AG), for example, which can be incorporated into the material of the body to be heated and which thus allow heating of the body throughout its volume, without any attendant significant detriment to its mechanical stability.

Because of the small size of these nanoscopic systems, however, it is not possible to bring about efficient heating of such products in alternating magnetic fields with frequencies from the medium frequency range. For the innovative systems, instead, frequencies from the high frequency range are required. It is at these frequencies in particular, however, that the problem of damage to electronic components in an alternating magnetic field is manifested to a particularly severe extent. Generating alternating magnetic fields with frequencies in the high frequency range, moreover, requires increased cost and complexity of apparatus, and is therefore unfavorable economically. Furthermore, the use of nanoparticulate fillers is a problem from the standpoint of the environment as well, since these fillers are not easily separated from the surrounding materials on subsequent recycling. It is difficult, furthermore, to use these particles in very thin films, since the strong tendency of nanoparticulate systems to form agglomerates means that the films produced therewith are usually very inhomogeneous.

Furthermore, and in order to avoid the above problems, it is possible for heat-activatable films (HAFs) which are intended to be inductively heatable to be filled with sheetlike metallic or metallized structures. This is very efficient in the context of the use of full-area metal foils, even in the medium frequency range; high heating rates can be achieved, and so induction times of between 0.05 and 10 s can be realized. Also possible in this context is the use of very thin conductive films of between 0.25 µm and 75 µm.

Also known is the use of perforated metal foils, wire meshes, expanded metal, metal webs or fibers, through which the matrix material of the HAF is able to penetrate, thereby improving the cohesion of the assembly. The efficiency of heating, however, goes down as a result.

For adhesive bonds within mobile electronic devices, the product Duolplocoll RCD from Lohmann is known, this product being equipped with inductively heatable nanoparticles. This product can be heated in a technically utilizable way exclusively in the high frequency range. The disadvantages described above with the use of particles and high-frequency alternating fields apply to this product as well.

SUMMARY

It is an object of the invention to provide a heat-activatable sheetlike element with which bonds, more particularly plastic/plastic bonds, can be realized with a very good bonding strength. The sheetlike elements are advantageously to be bondable by means of induction heating with high cycle rates, more particularly while avoiding the disadvantages of the prior art.

Especially for use in electronic devices, the sheetlike element ought to possess a high breakdown resistance in the direction perpendicular to the plane of bonding, in other words perpendicularly to the (average) areal extent of the sheetlike element.

DETAILED DESCRIPTION

As an achievement of the object, a heat-activatable adhesive tape is provided, more particularly for high-strength bonds of plastic on plastic, comprising at least one inductively heatable material and also at least one heat-activatable adhesive, the heat-activatable adhesive having a high thermal conductivity in the direction perpendicular to the (average) areal extent of the sheetlike element (also identified below as "z-direction"). It is very advantageous if the electrical conductivity in the z-direction is zero or at least negligibly small, in order to maintain the breakdown resistance.

The object is achieved in accordance with the invention more particularly by means of a heat-activatedly bondable sheetlike element comprising at least one heat-activatable adhesive, at least one inductively heatable material, and at least one thermally conductive filler (also identified as "thermally conductive additive"), the material of the filler having a thermal conductivity of at least 0.5 W/(m*K).

The thermally conductive filler is an additive which induces thermal conductivity within the layer of the heat-activatable pressure-sensitive adhesive, more particularly in the z-direction. Advantageously, the thermally conductive filler is composed wholly or at least partly of a material which has good thermal conductivity.

The heat-activatedly bondable sheetlike element advantageously has a thermal conductivity in the z-direction of at least 0.4 W/(m*K), more particularly of more than 0.8 W/(m*K). In one advantageous procedure, the thermally conductive filler is selected such that and/or added in an amount such that the heat-activatable adhesive has a thermal conductivity in the z-direction of at least 0.4 W/(m*K), more particularly of more than 0.8 W/(m*K).

The material of the thermally conductive filler advantageously has a thermal conductivity of more than 0.5 W/(m*K), preferably of more than 5 W/(m*K), more preferably of more than 10 W/(m*K). With increasing thermal conductivity on the part of the additive, it is possible to reduce the amount added in order to obtain a particular heat, thereby having less of a detrimental effect on the adhesiveness of the adhesive.

With great preference the thermally conductive additive is selected such that it is electrically nonconducting or only very slightly electrically conducting. In this way, high thermal conductivity is obtained for the sheetlike element, with the breakdown resistance maintained at the same time.

With particular advantage the sheetlike element is a double-sidedly heat-activatedly bondable sheetlike element.

Surprisingly it has been found that the bonding strengths of the sheetlike elements of the invention are greater than for comparable sheetlike elements which have no additives and/or do not satisfy the thermal conductivity coefficient. As a result of good thermal dissipation by conduction on the part of the inductively heatable material, more particularly on the part of the electrically conducting layer, the risk of instances of local overheating is smaller, and greater heating rates can be used.

For adhesives having a thermal conductivity in the range from 0.4 to 0.8 W/(m*K), a good compromise between bond strength and required filler content has been found. In the case of adhesives having thermal conductivities of 0.8 W/(m*K) or more, the high thermal conductivity results in particularly good heat distribution, allowing the disadvantages described above, more particularly owing to local heating, to be avoided here to particularly good effect.

Heat-activatable Adhesives

As the at least one heat-activatedly bonding adhesive it is possible in principle to employ all customary heat-activatedly bonding adhesive systems. Heat-activatedly bonding adhesives can be divided in principle into two categories: thermoplastic heat-activatedly bonding adhesives (hotmelt adhesives), and reactive heat-activatedly bonding adhesives (reactive adhesives). This subdivision also includes those adhesives which can be assigned to both categories, namely reactive thermoplastic heat-activatedly bonding adhesives (reactive hotmelt adhesives).

Thermoplastic adhesives are based on polymers which soften reversibly on heating and solidify again in the course of cooling. In contrast to these, reactive heat-activatedly bonding adhesives comprise reactive components. The latter constituents are also referred to as "reactive resins", in which heating initiates a crosslinking process which, after the end of the crosslinking reaction, ensures a permanent stable bond even under pressure. Thermoplastic adhesives of this kind preferably also comprise elastic components, examples being synthetic nitrile rubbers. Such elastic components give the heat-activatedly bonding adhesive a particularly high dimensional stability even under pressure, on account of their high flow viscosity.

Described below, purely by way of example, are a number of typical systems of heat-activatedly bonding adhesives which have emerged as being particularly advantageous in connection with the present invention.

A thermoplastic heat-activatedly bonding adhesive, then, comprises a thermoplastic base polymer. This polymer has good flow behavior even under low applied pressure, and so the ultimate bond strength that is relevant for the durability of a permanent bond comes about within a short applied-pressure time, and, therefore, rapid bonding is possible even to a rough or otherwise critical substrate. As thermoplastic heat-activatedly bonding adhesives it is possible to use all of the thermoplastic adhesives known from the prior art.

Suitability is possessed for example by those heat-activatable adhesives of the kind described in DE 10 2006 042 816 A1, without wishing these details to impose any restriction.

Exemplary compositions are described in EP 1 475 424 A1, for instance. Hence the thermoplastic adhesive may comprise, or even consist of, for example, one or more of the following components: polyolefins, ethylene-vinyl acetate copolymers, ethylene-ethyl acrylate copolymers, polyamides, polyesters, polyurethanes or butadiene-styrene block copolymers. Employed preferably, for instance, are the thermoplastic adhesives listed in paragraph [0027] of EP 1 475 424 A1. Further thermoplastic adhesives particularly suitable especially for specific fields of use such as the bonding of glass bond substrates, for example, are described in EP 1 95 60 63 A2. It is preferred to use thermoplastic adhesives whose melt viscosity has been raised by rheological additives, as for example through addition of fumed silicas, carbon black, carbon nanotubes and/or further polymers as blend components.

A reactive heat-activatedly bonding adhesive, in contrast, advantageously comprises an elastomeric base polymer and a modifier resin, the modifier resin comprising a tackifier resin and/or a reactive resin. Through the use of an elastomeric base polymer it is possible to obtain adhesive layers having outstanding dimensional stability. As reactive heat-activatedly bonding adhesives it is possible, in line with the specific applications in each case, to use all of the heat-activatedly bonding adhesives that are known from the prior art.

Also included here, for example, are reactive heat-activatedly bonding films based on nitrile rubbers or derivatives thereof such as, for instance, nitrile-butadiene rubbers or mixtures (blends) of these base polymers, additionally comprising reactive resins such as phenolic resins, for instance; one such product is available commercially under the name tesa 8401, for instance. On account of its high flow viscosity, the nitrile rubber gives the heat-activatedly bonding film a pronounced dimensional stability, allowing high bond strengths to be realized on plastics surfaces after a crosslinking reaction has been carried out.

Naturally, other reactive heat-activatedly bonding adhesives can be used as well, such as, for instance, adhesives comprising a mass fraction of 50% to 95% by weight of a bondable polymer and a mass fraction of 5% to 50% by weight of an epoxy resin or a mixture of two or more epoxy resins. The bondable polymer in this case comprises advantageously 40% to 94% by weight of acrylic acid compounds and/or methacrylic acid compounds of the general formula $CH_2=C(R^1)(COOR^2)$ ($R^1$ here represents a radical selected from the group encompassing H and $CH_3$, and $R^2$ represents a radical selected from the group encompassing H and linear or branched alkyl chains having 1 to 30 carbon atoms), 5% to 30% by weight of a first copolymerizable vinyl monomer which has at least one acid group, more particularly a carboxylic acid group and/or sulfonic acid group and/or phosphonic acid group, 1% to 10% by weight of a second copolymerizable vinyl monomer which has at least one epoxide group or an acid anhydride function, and 0% to 20% by weight of a third copolymerizable vinyl monomer which has at least one functional group different from the functional group of the first copolymerizable vinyl monomer and from the functional group of the second copolymerizable vinyl monomer. An adhesive of this kind allows bonding with rapid activation, the ultimate bond strength being achieved within just a very short time, with the result, overall, that an effectively adhering connection to a nonpolar substrate is ensured.

A further reactive heat-activatedly bonding adhesive which can be used, and which affords particular advantages, comprises 40% to 98% by weight of an acrylate-containing block copolymer, 2% to 50% by weight of a resin component, and 0% to 10% by weight of a hardener component. The resin component comprises one or more resins selected from the group encompassing bond strength enhancing (tackifying) epoxy resins, novolak resins, and phenolic resins. The hardener component is used for crosslinking the resins from the resin component. On account of the strong physical crosslinking within the polymer, a formulation of this kind affords the particular advantage that adhesive layers having a greater overall thickness can be obtained, without detriment overall to the robustness of the bond. As a result, these adhesive layers are particularly suitable for compensating unevenesses in the substrate. Moreover, an adhesive of this kind features good aging resistance and exhibits only a low level of outgassing, a particularly desirable feature for many bonds in the electronics segment.

As already mentioned above, however, apart from these particularly advantageous adhesives, it is also possible in principle to select and use all other heat-activatedly bonding adhesives in line with the particular profile of requirements for the adhesive bond.

Thermally Conductive Filler

The thermally conductive filler is added preferably in a modification which allows effective distribution within the adhesive, i.e., more particularly, in the form of (especially finely divided) particles ("filler particles") or bodies.

As thermally conductive filler it is possible accordingly, for example, to use carbon fibers, more particularly those of the kind described by EP 456 428 A2. Carbon fibers of this kind can be used advantageously in an amount of 20% to 60% by weight, based on the adhesive with fibers.

As thermally conductive filler it is preferred to use a filler which comprises particles or consists of particles that are composed of primary particles and that have a specific surface area per unit mass of 1.3 $m^2$/g or less. It has been observed, particularly in the case of such particulate additives having specific surface areas of less than 1.3 $m^2$/g, that they result in a significantly higher thermal conductivity in the heat-activatable adhesive than do particulate additives made from the same material but having a greater surface area.

The normal expectation, in contrast, would have been that the thermal conductivity of the adhesive increases in line with the specific surface area of the thermally conductive additive, since a larger surface area ought to mean a larger area for heat transfer, with the consequent assumption of an improved thermal transfer from the matrix polymer to the thermal conduction additive.

Tests have shown, however, that a highly thermally conductive thermal conduction composition of this kind possesses a sufficiently high internal cohesion only when the individual additive particles are additionally formed as accumulations of individual primary particles and hence have an irregularly shaped surface which is not smooth. Only in the case of such a three-dimensional structure on the part of the particles are these particles anchored structurally in the polymer matrix in a manner sufficiently firm that the resultant thermal conduction composition overall has a high level of cohesion and does not lose this cohesion even at relatively high temperatures under mechanical load.

It has proven particularly advantageous in this context if the primary particles have an average diameter of at least 1 µm or even of more than 2 µm, since in this way adhesives of high thermal conductivity are obtained whose cohesion is still high enough, even at high temperatures, at which the viscosity of the polymer matrix goes down, in order to ensure a stable cohesion overall.

In this context it is possible to achieve particularly high thermal conductivities on the part of the adhesive if the particles of the thermally conductive additive have an even lower specific surface area per unit mass, of not more than 1.0 $m^2$/g.

In one advantageous embodiment, the thermally conductive additive comprises at least substantially aluminum oxide particles and/or boron nitride particles or consists thereof. Particular preference is given to using those aluminum oxide particles and/or boron nitride particles which are composed of primary particles and which have a specific surface area per unit mass of 1.3 $m^2$/g or less.

By virtue of the use of such inert additives such as aluminum oxide particles and/or boron nitride particles, adhesives are obtained which have a high chemicals resistance and which, moreover, are advantageous from both an economic and an environmental standpoint, since these materials are readily available and at the same time are not toxic, and offer a good compromise, relative to other possible additives, in terms of high thermal conductivity in tandem with low costs.

Where the additive is or comprises aluminum oxide, it has proven particularly favorable for the aluminum oxide particles to consist of a proportion of more than 95% by weight of alpha-aluminum oxide, more particularly in a proportion of 97% by weight or more. In this way it is possible to prevent premature crosslinking or gelling within the adhesive by polymer components based on acrylic acid or methacrylic acid or esters thereof; such crosslinking or gelling may occur in the mixing assembly itself and results in a sharp rise in the viscosity. Where a high alpha-aluminum oxide proportion is taken into account, the resultant mixtures continue to remain outstanding processable. In contrast to this, for polymers based on esters of acrylic acid or methacrylic acid, it has been found that, when the proportion of gamma-aluminum oxide or beta-aluminum oxide rises to at least 5% by weight, there is gelling or crosslinking of the polymer right at the stage where the additive is being incorporated into the melt, meaning that the resultant adhesive can no longer be shaped or applied as a homogeneous layer.

On the basis of the results from the experimental investigations it is thought that the effect according to the invention derives from a lower level of interaction of alpha-aluminum oxide, relative to beta-aluminum oxide and gamma-aluminum oxide, with the polymeric phase, meaning that there is no formation of a superordinate network composed of a plurality of polymer molecules. With a mass fraction of gamma-aluminum oxide (and/or, possibly, of beta-aluminum oxide) of less than 5% by weight, based on the total mass of the aluminum oxide particles (corresponding to an alpha-aluminum oxide content of more than 95% by weight), it is not possible for a network to form that percolates throughout the volume of the adhesive, and hence complete gelling is prevented.

In this way it is possible to prevent premature crosslinking or gelling, within the thermally conductive pressure-sensitive adhesive, of polymer components based on acrylic acid or methacrylic acid or their esters; such premature crosslinking or gelling may occur in the mixing assembly itself, and results in a sharp increase in the viscosity. When a high proportion of alpha-aluminum oxide is taken into account, the resultant mixtures continue to remain outstandingly processable.

In this context there are certain adhesive systems where the problem of viscosity increase is particularly great, since in these systems the gelling of the polymer matrix occurs with particular ease. For this reason, for readily gelling adhesives of this kind, the application of the inventive concept has emerged as being particularly advantageous.

For instance, subsequent gelling is a problem especially with polymers which contain free acid groups or free hydroxyl groups, since in such polymers the interaction with the aluminum oxide is particularly strong. The advantageous effect of the present invention, therefore, is also particularly great in the case of these systems.

Gelling frequently occurs when the polymer composition is constructed of monomer units which are at least weakly acidic, examples being acrylates, methacrylates, their esters and derivatives of these, especially when these monomer units are present in the polymer composition in a high proportion of at least 50% by weight, based on the mass of the polymeric fractions of the adhesive. Polymer compositions of this kind are employed principally when the aim is to produce adhesives having a particularly high viscosity. Accordingly, the inventive concept is also particularly favorable in respect of highly cohesive adhesives with compositions of this kind.

Rapid gelling also occurs when the base polymer of the polymer composition has a high average molecular mass $M_w$ of at least 500 000 g/mol, more particularly of more than 1 000 000 g/mol, and so the present invention is likewise particularly meaningful in the case of adhesives of this kind.

Furthermore, a thermal conduction composition is particularly suitable if the material of the thermally conductive additive has a thermal conductivity of more than 1 W/(m*K), more particularly of more than 10 W/(m*K), favorably of more than 25 W/(m*K) or even of more than 100 W/(m*K). This ensures that the thermal conduction composition allows a high level of heat transfer even at a low level of additive included. The proportion of the thermally conductive additives in the adhesive can therefore be kept low, thus making it possible to realize highly cohesive adhesives.

It is particularly useful in this context if the thermally conductive additive is present in the adhesive in a proportion of at least 5% by volume and not more than 70% by volume, more particularly of at least 15% by volume and not more than 50% by volume, based in each case on the volume of the thermally conductive additive in the adhesive. In the case of aluminum oxide particles it is very advantageous if they are present in the highly cohesive, thermally conductive adhesive in a proportion of at least 20% by weight and not more than 90% by weight, based on the mass of the aluminum oxide particles in the pressure-sensitive adhesive. For aluminum oxide particles, an amount of 40% by weight to 80% by weight represents a particularly good compromise.

With the aforementioned quantities of additive it is ensured that the thermal conduction composition overall permits rapid heat transport from the heat source to the heat sink. This is attributable on the one hand to the high thermal conductivity of such adhesives, but also, on the other hand, to a level of internal cohesion of the polymer matrix that is sufficiently high under these conditions, and that even under mechanical load offers reliable thermal contact to the surfaces of the heat source and of the heat sink.

In addition, however, there may also be advantage in those thermally conductive adhesives which comprise aluminum oxide particles in a proportion of at least 20% by weight and not more than 40% by weight, specifically when adhesives with a particularly high bonding performance are to be realized, or in those which comprise aluminum oxide particles in a proportion of at least 80% by weight and not more than 90% by weight, specifically when particularly high thermal conductivity is required.

It is of advantage, furthermore, if the particles have an average diameter from a range from 2 μm to 500 μm, more particularly from a range from 2 μm to 200 μm or even from a range from 40 μm to 150 μm. As a result of this design of the additive, the thermal contact with the heat source and with the heat sink is in fact improved still further, since the particles on the one hand are sufficiently small to conform precisely to the shape of the surface of the heat source and of the heat sink, but on the other hand are sufficiently large to attain a high thermal conductivity without adversely affecting, overall, the internal cohesion of the thermal conduction composition.

Inductively Heatable Material

As inductively heatable material it is possible to use not only sheetlike structures (more particularly electrically conductive layers) but also particulate materials (particles), of the kind known per se for this purpose from the prior art. In the case of conductive particles, however, migration occurs again when a field is generated for heating, with the consequence that the problem of increased breakdown resistance becomes current again.

An electrically conducting layer is considered to be any layer of at least one material that has a conductivity (electrons and/or holes) at 23° C. of at least 1 mS/m, thus allowing an electrical current flow within said material. Such materials are, in particular, metals, semimetals, and also other metallic materials, and possibly also semiconductors in which the electrical resistance is low. Accordingly, the electrical resistance of the electrically conducting layer is on the one hand high enough to allow heating of the layer when an electrical current is flowing in the layer, but on the other hand is also low enough for a current flow to be actually established through the layer. Also considered to be electrically conducting layers, as a special case, are layers of materials which have a low magnetic resistance (and hence a high magnetic conductivity or magnetic permeability), examples being ferrites, although the latter frequently have a relatively high electrical resistance given alternating currents of low frequencies, and so heating here is frequently achieved only with alternating magnetic field frequencies that tend to be relatively high.

It is preferred to make use, for example, of electrically conductive sheetlike materials (sheetlike structures), since these materials can be heated with low frequencies, resulting in a higher depth of penetration of the magnetic field and also in lower equipment costs. These electrically conductive sheetlike structures preferably have a thickness of less than 100 µm, more particularly less than 50 µm, and especially less than 20 µm, since as the thickness of the electrically conducting sheetlike structure goes down, the adhesive tapes become more flexible and, more particularly at very low thicknesses, acquire a sufficient breakdown resistance.

With particular advantage, therefore, the heat-activatedly heatable material is an electrically conductive sheetlike structure, more particularly an electrically conductive layer. Such structures are coated on at least one side, more particularly from both sides, with the heat-activatable adhesive modified in accordance with the invention. This produces an outstanding breakdown resistance.

In one advantageous embodiment, the electrically conducting layer of the heat-activatedly bondable sheetlike element has a layer thickness of less than 20 µm, more particularly of less than 10 µm, in order to limit its heating rate in a particularly simple way. Furthermore, the sheetlike element may have a further heat-activatedly bonding layer of adhesive. A sheetlike element of such kind, as a double-sidedly bondable sheetlike element, is particularly suitable for joining two bonding substrates to one another.

At the same time, additionally, the electrically conducting layer is preferably also magnetic, more particularly ferromagnetic or paramagnetic. Although it was expected that in such materials, in addition to the induction of eddy currents, there is also a heating as a result of hysteresis losses, with an overall greater heating rate as a result, the actual observation, in contrast, was that even magnetic materials such as nickel or magnetic steels, which are good conductors of electrical current, all have lower heating rates than materials which, while conducting the electrical current very well, are themselves not magnetic, such as copper or aluminum, for example. It is therefore possible, by using magnetic materials which conduct the electrical current, to control the heating more easily and to lessen the occurrence of heating effects away from the bondline.

It is favorable, furthermore, if the electrically conducting layer has an electrical conductivity of more than 20 MS/m (which can be achieved, for example, by using aluminum), more particularly of more than 40 MS/m (which can be achieved, for example, by using copper or silver), determined in each case for 300 K. In this way it is possible to realize the sufficiently high bondline temperatures that are required for producing high strengths in the adhesive bond, and also to realize homogeneous through-heating, even in very thin sheetlike elements. Surprisingly it has been observed that heating increases with increasing conductivity, as a result of eddy currents induced, and not, as expected, with increasing electrical resistance.

Sheetlike Element Constructions

A sheetlike element is considered for the purposes of this specification to encompass, in particular, all customary and suitable structures having substantially sheetlike extent. These structures allow two-dimensional bonding and may take various forms, more particularly flexible, in the form of an adhesive sheet, adhesive tape, adhesive label or shaped diecut. The sheetlike element may be designed in the form of a cut-to-size sheetlike element, the shape of which is adapted to the shape of the bonding area, in order to reduce the risk of the bonding substrate suffering thermal damage in the course of the inductive heating.

Sheetlike elements in the sense of this specification each have two side faces, a front face and a back face. The terms "front face" and "back face" here refer to the two surfaces of the sheetlike element parallel to its principal extent (two-dimensional extent, principal plane of extent) and serve merely to distinguish these two faces, disposed on opposite sides of the sheetlike element, without the choice of the terms determining the absolute three-dimensional arrangement of the two faces; accordingly, the front face may also constitute that side face of the sheetlike element that lies at the back three-dimensionally, and namely when, accordingly, the back face forms the side face thereof that lies at the front three-dimensionally.

This heat-activatedly bondable sheetlike element is to be bonded to a bonding substrate. For this purpose, at least on one of its two side faces, the sheetlike element has a heat-activatedly bonding adhesive, preferably in fact on both side faces. Heat-activatedly bonding adhesives are all adhesives which are bonded hot at elevated temperatures and, after cooling, afford a mechanically robust connection. The adhesive is present typically in the form of a layer of adhesive.

A layer is more particularly a sheetlike arrangement of a system of unitary functionality whose dimensions in one spatial direction (thickness or height) are significantly smaller than in the two other spatial directions (length and width), which define the principal extent. A layer of this kind may be compact or else perforated in form, and may consist of a single material or of different materials, especially when these materials contribute to the unitary functionality of said layer. A layer may have different thicknesses or else a thickness which is constant over its entire two-dimensional extent. Furthermore, of course, a layer may also have more than one single functionality.

The sheetlike element to be bonded in the present context advantageously comprises at least two different layers, these being at least one electrically conducting layer and at least one heat-activatedly bonding layer of adhesive.

The at least one electrically conducting layer may in principle be of any suitable design—for example, a thin layer which is compact over its full area or is perforated (in the form of a lattice, for example). The thickness of the electrically conducting layer is preferably less than 50 µm, more particularly less than 20 µm or, indeed, less than 10 µm. The latter makes it possible to limit the heating rate at the upward end in a relatively simple way.

The electrically conducting layer may consist of all customary and suitable materials, such as of aluminum, copper, gold, nickel, Mu-metal, alnico, permalloy, ferrite, carbon nanotubes, graphenes, and the like. The electrically conducting layer in this case is preferably also magnetic as well, more particularly ferromagnetic or paramagnetic. The electrically conducting layer in this case advantageously has an electrical conductivity of more than 20 MS/m (corresponding to a specific resistance of less than 50 mΩ·mm$^2$/m), more particularly of more than 40 MS/m (corresponding to a specific resistance of less than 25 mΩ·mm$^2$/m), determined in each case for 300 K.

In addition to the at least one electrically conducting layer, the sheetlike element may of course also have further electrically conducting layers; these layers may be identical to or different from the at least one electrically conducting layer.

Overall, the heat-activatedly bondable sheetlike element may be of any suitable design. Thus the sheetlike element, in addition to the two layers described above, may comprise further layers, examples being permanent carriers or temporary carriers. Furthermore, the sheetlike element may be designed to be bondable on only one of its two side faces or to be bondable on both side faces, in the form, for instance, of a single-sidedly bondable or double-sidedly bondable adhesive tape. In the latter case, the sheetlike element has at least one further layer of adhesive, which may be identical to or different from the at least one heat-activatedly bonding adhesive. Accordingly, the further layer of adhesive may comprise, for example, a heat-activatedly bonding adhesive or even a pressure-sensitive adhesive.

In order to attain a sufficient breakdown resistance, the layers of the heat-activatable adhesive ought advantageously to be at least 10 µm thick, preference being given to a thickness of between 20 and 50 µm, in order to guarantee sufficient breakdown resistance with sufficient adhesive strength. For particularly strong adhesive bonds, in contrast, a thickness of 50-200 µm is advantageous.

In one advantageous embodiment of the sheetlike element of the invention, characteristically,
the sheetlike element has a thickness of less than 70 µm, more particularly of less than 50 µm, especially of less than 30 µm,
and/or the electrically conducting sheetlike material has a thickness of less than 30 µm, more particularly less than 20 µm, especially less than 15 µm,
and preferably, after production of the adhesive bond, by heating of the adhesive tape by means of magnetic induction, the bonding strength in the static shear test to polycarbonate is greater than 400 N/cm$^2$.

It is advantageous, furthermore, to coat electrically conductive sheetlike material with the heat-activatable adhesive from both sides, in order to ensure a sufficient breakdown resistance.

Method

The invention further provides a method for bonding a heat-activatedly bondable sheetlike element to a particular kind of bonding substrates.

These bonding substrates may in principle be made of any material which can be bonded by means of heat-activatable adhesives (hence, in particular, which withstands the temperatures employed in such a method). The materials to be bonded may be the same or different.

With particular advantage, the method of the invention is used to bond two identical or two different plastics to one another.

In a first version, the method is characterized in that a sheetlike element of the invention is used.

It is advantageous to use the heat-activatable sheetlike elements of the invention in a method wherein these sheetlike elements are heated at a heating rate of more than 50° C., more particularly of more than 100° C. The adhesive tapes of the invention are particularly suitable for high heating rates, since on account of their thermal conductivity they are able to conduct excess heat away, and so the risk of local overheating is low (see above). As a result of the better thermal distribution, therefore, greater heating rates can be realized.

Use

The sheetlike element of the invention is used preferably for bonding subassemblies of electronic devices, as for instance those from the consumer electronics, entertainment electronics or communications electronics segments (for example, for cell phones, PDAs, laptops and other computers, digital cameras and display devices such as, for instance, displays, digital readers or organic light-emitting diode displays (OLEDs), and also for solar cell modules, such as, for instance, electrochemical dye solar cells, organic solar cells or thin-film cells). Subassemblies in the present context are all constituents and collections thereof that are used in electronic devices, examples being electronic components (discrete and integrated components), housing parts, electronic modules, antennas, display arrays, protective screens, populated and/or nonpopulated circuit boards, and the like.

The sheetlike element of the invention can be implemented using an induction heating means (inductor) which is customary for inductive heating. Induction heating means (inductors) contemplated include all customary and suitable arrangements, in other words, for instance, coils, conductor loops or conductors through which an alternating electrical current flows, and which generate an alternating magnetic field of appropriate strength as a result of the current flowing through them. Accordingly, the magnetic field strength necessary for heating may be provided by a coil arrangement with an appropriate number of turns and length of coil, through which a corresponding current is flowing, in the form of a point inductor, for example. This point inductor may be designed without a ferromagnetic core, or else may have a core, made of iron or pressed ferrite powder, for example. The preliminary assembly may be exposed directly to the magnetic field thus generated. Alternatively, of course, it is also possible to arrange the above coil arrangement as a primary winding on the primary side of a magnetic field transformer, on whose secondary side a secondary winding provides a correspondingly higher current. As a result, the actual excitation coil, arranged in the immediate vicinity of the preliminary assembly, can have a lower number of turns, as a result of the higher current, without the field strength of the alternating magnetic field being reduced as a result.

Where the preliminary assembly is subjected to a pressing pressure in the course of the inductive heating, there is an additional requirement for a pressing device for this purpose. As a pressing device it is possible to use all devices suitable for exerting a pressing pressure, examples being discontinuously operating pressing machines such as, for instance, a pneumatic press or hydraulic press, an eccentric press, a crank press, a toggle press, a spindle press or the like, or else continuously operating pressing machines such as a pressing roll, for instance. The device may be provided as a separate unit or else may be present in conjunction with the inductor. It is preferred, for instance, to employ a device which as a first pressing tool comprises at least one press-ram element which additionally has an induction heating means. As a result, the induction field can be brought very close to the bond site to be formed, and thus also can be limited three-dimensionally to the area of this bond site.

Result

With the sheetlike elements of the invention it is possible outstandingly to realize bonds of two substrates to one another, more particularly plastic/plastic bonds, by means of induction heating, with high cycle rates, while avoiding the disadvantages of the prior art. Surprisingly it has been found that the bonding strengths of the sheetlike elements of the invention are greater than with known bonds using adhesive tapes according to the prior art. With the sheetlike elements of the invention it is possible to conduct the heat (formed during inductive heating) more effectively away from the electrically conducting sheetlike structure (inductively heatable material) and/or from the thermally conductive additives, thereby lowering the risk of local overheating and allowing the realization of greater heating rates.

Experimental Investigations

For determining the thermal conductivity of the adhesives with the thermally conductive auxiliaries, a method according to ISO draft 22007-2 was carried out (thickness of the test specimens: 10 mm on both sides of the sheetlike heating element).

The bonding strength was determined in a dynamic tensile shear test in a method based on DIN 53283 at 23° C. with a testing speed of 1 mm/min.

The electrical breakdown resistance of the pressure-sensitively adhesive sheetlike elements obtained with the thermal conduction compositions was determined in accordance with VDE 0100.

The heat-activatable adhesives used were as follows:

| Adhesive | Type | Description |
|---|---|---|
| 1 | tesa HAF 8400 | Nitrile rubber/phenolic resin |
| 2 | tesa HAF 8865/8860 | Synthetic rubber/epoxy resin |
| 3 | tesa HAF 8440 | Copolyamide |
| 4 | tesa HAF 8464 | Copolyester |

The following fillers were selected for increasing the thermal conductivity:

| Filler | Type | Manufacturer figures (Composition % figures in % by weight) |
|---|---|---|
| 1 | Nabalox 105 Nabaltec AG, Schwandorf | $Al_2O_3$ 99.6%; $SiO_2$ 0.02%, $Na_2O$ 0.3%, $Fe_2O_3$ 0.03%, specif. surface area (BET) <1 $m^2/g$, $\alpha$-$Al_2O_3$ content 98%, average particle diameter 80 µm, primary crystal size 2 µm, particle diameter <45 µm: about 20%, net density 3.9 $g/cm^3$, bulk density 950 $g/m^3$, pouring angle 50° |
| 2 | Nabalox 115-125 Nabaltec AG, Schwandorf | $Al_2O_3$ 99.6%; $SiO_2$ 0.03%, $Na_2O$ 0.3%, $Fe_2O_3$ 0.03%, specif. surface area (BET) 1 $m^2/g$, $\alpha$-$Al_2O_3$ content 98%, average particle diameter 4 µm, primary crystal size 2 µm, net density 3.9 $g/cm^3$, bulk density 800 $g/m^3$ |
| 3 | Nabalox 715-10 Nabaltec AG, Schwandorf | $Al_2O_3$ 99.6%; $SiO_2$ 0.03%, $Na_2O$ 0.3%, $Fe_2O_3$ 0.03%, specif. surface area (BET) 1.6 $m^2/g$, $\alpha$-$Al_2O_3$ content 98%, average particle diameter 2.5 µm, primary crystal size 2 µm, bulk density 800 $g/m^3$, green density (100 Mpa, about 4% moisture) 2.35 $g/cm^3$, sinter density 3.65 $g/cm^3$, sinter temperature 1725° C. linear contraction 13% |
| 4 | $\alpha$-Aluminum oxide nanoparticles IBU-tec advanced materials GmbH, Weimar | |
| 5 | Boron nitride Grade A 01 CeramTec AG, Plochingen | |
| 6 | Aluminum powder, fine; spherical particles, about 25 µm TLS Technik GmbH & Co, Bitterfeld | |

MagSilica 50-85: nanoparticles, from Evonik, Matrix: $SiO_2$, magnetic domains iron oxide, domain content 80-92% by weight, surface size 40-50 $m^2/g$, diameter 82±11 nm, density 3.72 $g/cm^3$, volume fraction of magnetites in the particle: 40% by volume The following thermally conductive adhesives and corresponding comparative examples were produced:

| | Adhesive | Filler | Proportion of filler [% by volume] | $\lambda$ [W/mK] |
|---|---|---|---|---|
| Example | | | | |
| 1 | 1 | 1 | 40 | 1.2 |
| 2 | 1 | 2 | 20 | 0.43 |
| 3 | 1 | 2 | 31.5 | 0.71 |
| 4 | 1 | 2 | 40 | 0.99 |
| 5 | 1 | 3 | 40 | 0.74 |
| 6 | 1 | 4 | 40 | 0.56 |
| 7 | 1 | 5 | 40 | 1.29 |
| 8 | 2 | 2 | 20 | 0.39 |
| 9 | 3 | 2 | 20 | 0.43 |
| 10 | 4 | 2 | 20 | 0.44 |
| 11 | 1 | 6 | 40 | 0.85 |
| 12 | 3 | 2 | 20 + 10% by weight MagSilica 50-85 (Degussa AG, Hanau) | 0.45 |
| Comparative example | | | | |
| C1 | 1 | | 0 | 0.20 |
| C2 | 2 | | 0 | 0.18 |
| C3 | 3 | | 0 | 0.22 |
| C4 | 4 | | 0 | 0.23 |
| C5 | 1 | MagSilica 50-85 | 10% by weight | 0.28 |

For producing the thermally conductive adhesives, in the case of adhesive types 1 and 2, the adhesive tape was dissolved at room temperature in butanone and a solids content of 30% by weight was set. The fillers were dispersed using a high-speed stirring assembly of the Ultraturrax type. Films of adhesive were then coated out using a doctor blade and dried, giving a film thickness of approximately 100 µm.

For example 12, in addition to the thermally conductive filler, 10% by weight of an inductively heatable filler was incorporated additionally.

In the case of adhesive types 3 and 4, the fillers were incorporated into the melt at a temperature of 180° C. in a laboratory kneading apparatus from Haake. Sheetlike moldings having a thickness of about 100 µm were then produced at a temperature of 150° C. in a vacuum press.

The electrically conductive sheetlike structure used for induction heating was an aluminum foil with a thickness of 36 µm. For examples 1-11 and C1-C4, the metal foil was laminated together on both sides in each case with the layers of adhesive at a temperature of about 90-115° C., depending on the adhesive system. In the case of adhesives 1 and 2, the chemical crosslinking reaction is not initiated here; instead, merely an adhesion is induced.

Figure 1:
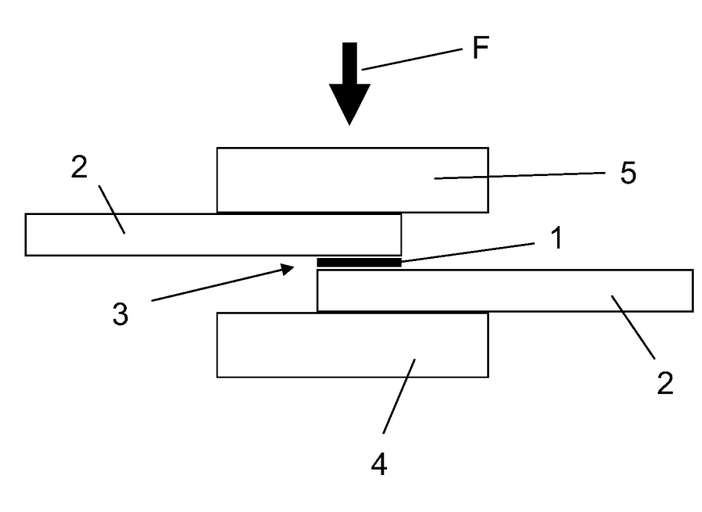
FIG. 1 illustrates a system in an embodiment of the present disclosure.

Bonding substrates used for the inventive adhesive tape 1 were 2 polycarbonate sheets 2 20 mm in width, 100 mm in length, and 3 mm in thickness, which overlapped at the bondline 3 by 10 mm (cf. FIG. 1). In this case, therefore, the bonding area encompassed a rectangle with an edge length of 10×20 mm. In order to investigate the differential separation of the adhesive tape, the adherends selected were made from the same material. FIG. 1 additionally shows, schematically, the lower press-ram element 4, the upper press-ram element 5, and the force F.

The bonding method was carried out, except in the case of example 12, using a modified induction system of type EWSF from IFF GmbH, Ismaning (DE). Serving as the inductor for local provision of the alternating magnetic field here is an induction field transformer composed of just one water-cooled current-bearing conductor, which is used as a secondary coil circuit in a transformer-field transformer and which interacts in a coaxial transformer with the transformer field generated on the primary coil side. The induction field transformer was embedded into a matrix of polyetheretherketone (PEEK) and the resultant arrangement was used as the lower press-ram element 4 of a press device, which also has an upper press-ram element 5. The applied pressure resulting from the force F, which was applied to the preliminary assembly between the lower press-ram element 4 and the upper press-ram element 5, perpendicularly to the side faces of the heat-activatedly bondable sheetlike element, was 2 MPa in each case.

With the aid of the modified induction system, alternating magnetic fields with a frequency of 30 kHz were produced with a pulse width of 70% for the investigations. The pulse width indicates the percentage fraction of the pulse duration (pulse length) of the alternating magnetic field as a proportion of the overall period duration (the sum of pulse duration and the duration of the pauses between two successive pulses) of the alternating magnetic field. The time for which the heat-activatedly bondable sheetlike element was exposed to the pulsed alternating magnetic field (i.e., the duration of inductive heating) lay within a range from 3 s to 9 s.

All experiments (apart from example 12) were carried out, furthermore, with a subsequent pressing time of 8 s, within which there was inductive afterheating in an alternating magnetic field of the same frequency as for the thermal activation of the adhesives, with a pulse width of 20% (corresponding to a ratio of pulse duration to pause duration of 1:4).

For example 12, a high-frequency induction system from Celes was used, which operated with a 3.5-turn plate inductor at a frequency of 586 kHz and was run with a power consumption of 20 kW. The samples were placed on the plate inductor, lined with a 0.25 mm plate of glass fiber-reinforced plastic, and were loaded with a weight force of approximately 20 N, which was guided on to the joining site via a plastics rod.

Results:

The results show average values from five test bonds in each case.

|  | Induction time [s] | Pressing pressure [MPa] | Adhesive strength [N/cm$^2$] | Breakdown resistance |
|---|---|---|---|---|
| Example |  |  |  |  |
| 1 | 9 | 2 | 652 | pass |
| 2 | 9 | 2 | 566 | pass |
| 3 | 9 | 2 | 585 | pass |
| 4 | 9 | 2 | 597 | pass |
| 5 | 9 | 2 | 572 | pass |
| 6 | 9 | 2 | 579 | pass |
| 7 | 9 | 2 | 636 | pass |
| 8 | 9 | 0.5 | 504 | pass |
| 9 | 3 | 0.2 | 444 | pass |
| 10 | 3 | 0.2 | 379 | pass |
| 11 | 9 | 2 | 611 | fail |
| 12 | 10 | 0.1 | 559 | pass |
| Comparative example |  |  |  |  |
| C1: tesa HAF 8400 | 9 | 2 | 552 | pass |
| C2: tesa HAF 8865/8860 | 9 | 0.5 | 462 | pass |
| C3: tesa HAF 8440 | 2 | 0.2 | 403 | pass |
| C4: tesa HAF 8464 | 2 | 0.2 | 345 | pass |
| C5: tesa HAF 8400 + 10% by weight MagSilica |  |  | 531 | pass |

The results show that as a result of the increased thermal conductivity, improved bonding strengths are achieved. This is unexpected, since to increase the thermal conductivity it is necessary to add a high volume fraction of fillers, and so the skilled person expects that the bonding strengths will fall.

The electrical breakdown resistance test in accordance with VDE 0100 was likewise passed by all inventive samples with the exception of experiment 11. From this it can be seen that thermal conduction compositions of the invention can be made electrically nonconducting and hence can be used even in those applications where electrical insulation from components connected in a thermally conducting way is required, such as in electronic devices, for instance. Furthermore, the electrical breakdown resistance is not adversely affected by the internal metal foil.

We claim:

1. A method comprising:
coating heat-activatable adhesive layers onto opposing sides of at least one electrically conducting layer to provide an element; and
bonding the element to one or more bonding substrates by inductive heating using at least one alternating magnetic field at a frequency and a pulse width to form an assembly, a range of the frequency is from 100 Hz to 200 kHz and a range of the pulse width is from 20% to 70%, and the pulse width is a percentage fraction of a pulse duration of the at least one alternating magnetic field as a proportion of an overall period duration of the at least one alternating magnetic field; and
applying pressing pressure, exerted by a pressing device, to the assembly while inductive afterheating the assembly using the at least one alternating magnetic field,
wherein
the at least one electrically conducting layer has an electrical conductivity of more than 40 MS/m for 300K,
the heat-activatable adhesive layers consist of a single heat-activatable adhesive material comprising at least one thermally conductive filler, and
material of the thermally conductive filler has a thermal conductivity of at least 0.5 W/(m*K) and is electrically nonconducting such that the element provides, in a direction perpendicular to the areal extent of the element, an electrical breakdown resistance, as determined in accordance with VDE 0100, wherein the material of the thermally conductive filler is electrically nonconducting.

2. The method element according to claim 1, wherein the thermally conductive filler is used in a form of filler particles and/or comprises filler particles.

3. The method according to claim 2, wherein the filler particles are aluminum oxide particles which consist to a proportion of more than 95% by weight of alpha-aluminum oxide.

4. The method according to claim 3, wherein the proportion of the aluminum oxide particles, based on the heat-activatable adhesive with the thermally conductive filler, is in the range from 20% to 90% by weight.

5. The method according to claim 3, wherein the proportion of the aluminum oxide particles, based on the heat-activatable adhesive with the thermally conductive filler, is in the range from 40% to 80% by weight.

6. The method according to claim 2, wherein the filler particles are primary particles having a specific surface area per unit mass of 1.3 m$^2$ or less.

7. The method according to claim 6, wherein a proportion of the primary particles, based on the heat-activatable adhesive with the filler, is in the range from 5% to 70% by volume.

8. The method according to claim 6, wherein a proportion of the primary particles, based on the heat-activatable adhesive with the filler, is in the range from 15% to 50% by volume.

9. The method according to claim 2, wherein the filler particles have an average diameter of at least 1 μm.

10. The method according to claims 2, wherein the filler particles are primary particles having a specific surface area per unit mass of 1.0 m$^2$ or less.

11. The method according to claim 2, wherein the filler particles have an average diameter between 2 μm and 500 μm.

12. The method according to claim 2, wherein the filler particles have an average diameter between 2 and 200 μm.

13. The method according to claim 2, wherein the filler particles have an average diameter between 40 μm and 150 μm.

14. The method according to claim 1, wherein the element is heated at a heating rate of more than 50° C. to bond the element to the one or more bonding substrates.

15. The method according to claim 14, wherein the element is heated at a heating rate of more than 100° C. to bond the element to the one or more bonding substrates.

16. A method comprising:
coating heat-activatable adhesive layers onto opposing sides of at least one electrically conducting layer to provide an element; and
bonding the element to one or more bonding substrates by inductive heating using at least one alternating magnetic field at a first pulse width to form an assembly, a frequency of the at least one alternating magnetic field is situated in a frequency range from 100 Hz to 200 kHz, a duration of the inductive heating is within a range from 3 seconds to 9 seconds; and
applying pressing pressure, exerted by a pressing device, to the assembly while inductive afterheating the assembly using the at least one alternating magnetic field at a second pulse width that is less than the first pulse width, and each of the first pulse width and the second pulse width is a ratio of pulse duration to pause duration,
wherein
the at least one electrically conducting layer has an electrical conductivity of more than 40 MS/m for 300K,
the heat-activatable adhesive layers consist of a single heat-activatable adhesive material comprising at least one thermally conductive filler, and
material of the thermally conductive filler has a thermal conductivity of at least 0.5 W/(m*K) and is electrically nonconducting such that the element provides, in a direction perpendicular to the areal extent of the element, an electrical breakdown resistance, as determined in accordance with VDE 0100, wherein the material of the thermally conductive filler is electrically nonconducting.

\* \* \* \* \*